United States Patent
Bialer et al.

(10) Patent No.: US 9,094,266 B2
(45) Date of Patent: Jul. 28, 2015

(54) EFFICIENT DE-SPREADING

(71) Applicant: Gilat Satellite Networks Ltd., Petah Tikva (IL)

(72) Inventors: Oded Bialer, Petah Tikva (IL); Uzi Ram, Givat Elah (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 0 days.

(21) Appl. No.: 14/084,184

(22) Filed: Nov. 19, 2013

(65) Prior Publication Data

US 2014/0328378 A1 Nov. 6, 2014

Related U.S. Application Data

(60) Provisional application No. 61/819,303, filed on May 3, 2013.

(51) Int. Cl.
*H04L 27/06* (2006.01)
*H04L 27/22* (2006.01)

(52) U.S. Cl.
CPC .................................... *H04L 27/22* (2013.01)

(58) Field of Classification Search
CPC ...................................................... H04L 27/22
USPC ........................................ 375/316, 324, 340
See application file for complete search history.

(56) References Cited

U.S. PATENT DOCUMENTS

| | | | | |
|---|---|---|---|---|
| 5,574,399 A | * | 11/1996 | Oura et al. | 329/306 |
| 2002/0054633 A1 | * | 5/2002 | Hessel et al. | 375/229 |
| 2004/0120412 A1 | * | 6/2004 | Banerjea | 375/260 |
| 2007/0280098 A1 | * | 12/2007 | Bhatt et al. | 370/208 |
| 2008/0043885 A1 | * | 2/2008 | Markman | 375/343 |

* cited by examiner

*Primary Examiner* — Freshteh N Aghdam
(74) *Attorney, Agent, or Firm* — Banner & Witcoff, Ltd.

(57) ABSTRACT

Satellite communication systems utilize spreading by repetition techniques, including block repetition, to enable operation at low signal to noise conditions. A carrier frequency offset between a transmitter and a receiver results in phase offsets between repetitions. Thus, combining the repetitions requires estimation of the phase offset between the repetitions before coherent de-spreading can be performed. Disclosed herein are methods for estimating a phase offset between successive block repetitions. The methods may utilize more than two repetitions for determining a common phase offset between any two successive repetitions. In some embodiments, these methods may allow summation of repetitions with better coherency and/or with a lower de-spreading loss.

28 Claims, 4 Drawing Sheets

EFFICIENT DE-SPREADING

PRIORITY CLAIM

This application claims priority to U.S. Provisional Patent Application Ser. No. 61/819,303, filed May 3, 2013, and entitled "Efficient De-Spreading," the disclosure of which is incorporated by reference herein in its entirety and made part hereof.

FIELD

Aspects of the disclosure pertain to satellite communication systems and in particular to satellite communication systems in which spectrum spreading is used.

BACKGROUND

In satellite communication systems, reception at low signal to noise ratio (SNR) is evident when the receiving antenna is small and/or the signal being received is transmitted at limited (low) power. Spreading techniques are well known to enable reliable communication under low SNR conditions. In one such spreading technique, known as repetitions, each symbol is transmitted several times and the repetitions are coherently combined at a receiver. Thus, while each transmitted instance of a symbol is received at a low SNR, the SNR of a symbol combined from all its repetition instances is high enough to enable reliable communication.

In one method for transmitting symbol repetitions, known as block repetition, successive repetitions of an entire block of symbols are transmitted. Carrier frequency offsets between a transmitter and a receiver cause the phase of received symbols to rotate with time. Consequently, phase offsets appear between repetitions of the same symbol, making simple (non-coherent) combining of repetitions of the same symbol ineffective. Therefore, when combining repetitions it is necessary to first estimate the phase offset between the combined repetitions, to cancel the estimated phase offset and only then to combine (sum) the repetitions (coherent combining).

In one approach towards coherent combining of repetitions, phase offset estimation and combining the phase-corrected repetitions is done gradually. First, a phase offset between the first repetition and the second repetition is estimated, the phase of the second repetition is corrected in accordance with the estimated phase offset (i.e., the phase offset is canceled) and the two repetitions are summed (combined), resulting in a first combined repetitions result. Then, the phase offset between the first combined repetitions result and the third repetition is estimated, the phase offset of the third repetition is canceled and the third repetition is added to the first combined repetitions result, resulting in a second combined repetitions result. In case there are additional repetitions, the process described above continues in a similar manner until all the repetitions are combined.

However, the method described above (i.e., block phase offset estimation, phase-offset cancelation, and combining) yields poor results when the signal is received at low SNR. The fundamental weakness of that method is the phase estimation accuracy. Since the phase estimations are performed in stages, wherein at each stage the phase offset is estimated using only a relatively small portion of the received signal's energy, the estimation accuracy is significantly degraded when the signal is received at low SNR. With the phase estimations being significantly inaccurate, the combining of the repetitions becomes non-coherent and thus ineffective.

SUMMARY

The following presents a simplified summary in order to provide a basic understanding of some aspects of the disclosure. The summary is not an extensive overview of the disclosure. It is intended neither to identify key or critical elements of the disclosure nor to delineate the scope of the disclosure. The following summary merely presents some aspects of the disclosure in a simplified form as a prelude to the description below.

Aspects of the disclosure are directed to methods for at least estimating a phase offset between successive block repetitions. The disclosed methods may utilize more than two repetitions in order to determine a common phase offset between any two successive repetitions. In some embodiments, these methods may allow summation of repetitions with better coherency and/or with a lower de-spreading loss.

Aspects of the disclosure are directed to a satellite communication system comprising at least one transmitter and at least one receiver, wherein the at least one transmitter may be configured to transmit towards the at least one receiver modulated symbols using a block repetition technique and the at least one receiver may be configured to receive block repetitions of modulated symbols and to use any of the above mentioned methods for at least the purpose of estimating a phase offset between received repetitions. In some embodiments, the at least one receiver may be further configured to use said estimated phase offset for at least the purpose of coherently combining the received repetitions.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Figure 1:
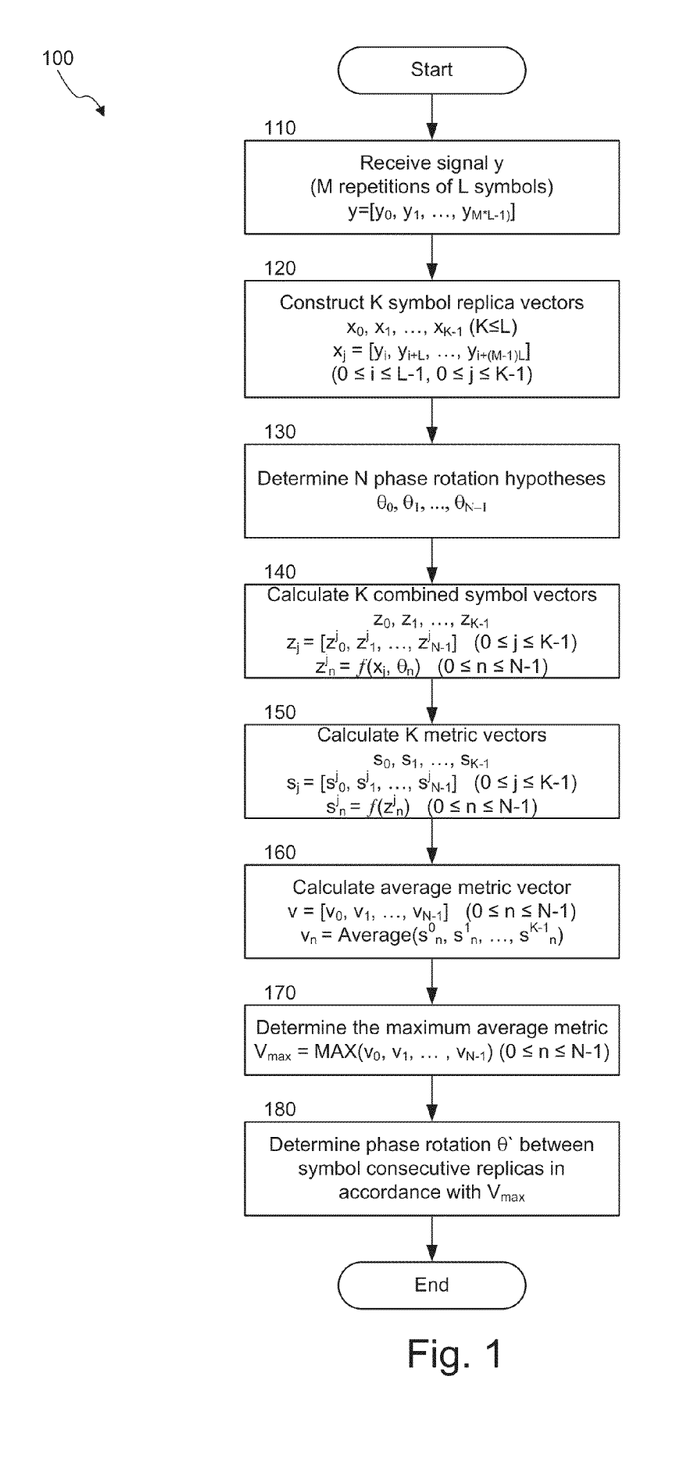
FIG. 1 shows an example flowchart of an algorithm for estimating a phase offset between repetitions in accordance with aspects of the disclosure.

In one aspect of the disclosure, a method for at least estimating a phase offset between repetitions may be presented. With reference to FIG. 1, flowchart 100 may represent an algorithm for at least estimating a phase offset between (received) repetitions in accordance with aspects of the disclosure.

A signal may comprise modulated symbols. A vector a comprising L symbols (e.g., $a=[a_0, a_1, \ldots, a_{L-1}]$, L>0), may represent a block of modulated symbols of length L. Vector a may be transmitted using a block repetition technique. A vector b (e.g., $b=[a, a, \ldots, a]$) may represent a transmitted vector of symbols, wherein vector b may comprise M repetitions (e.g., M≥2) of vector a, and wherein M may represent the number of repetitions and/or the spreading factor.

Vector b may be transmitted via a medium (for example, a satellite link, any other wireless link, or any wired link) and received by a receiver as vector y (e.g., $y=[y_0, y_1, \ldots, y_{ML-1}]$) (110). Upon receiving vector y, the receiver may be configured to construct K vectors $x_0$ to $x_{K-1}$ (e.g., wherein K≤L) (120), wherein each vector $x_j$ (e.g., $x_j=[x^j_0, x^j_1, \ldots, x^j_{M-1}]=$ $[y_i, y_{i+L}, \ldots, y_{i+(M-1)L}]$, wherein $0 \leq i \leq L-1$ and $0 \leq j \leq K-1$) may comprise received replicas of the same symbol (e.g., symbol $y_i$). In some embodiments, each vector $x_j$ may comprise all the received replicas (e.g., M replicas) of the same symbol (e.g., symbol $y_i$). It may be noted that received replicas of a symbol may be originally located in vector y at intervals of L symbols. In some embodiments, the number of vectors $x_j$ (e.g., K) may equal the number of symbols in the original block of symbols (e.g., K=L). In such embodiments the receiver may be configured to use all the received symbols for at least the purpose of estimating a phase offset between repetitions. In some embodiments, the number of vectors $x_j$ (e.g., K) may be smaller than the number of symbols in the original block of symbols (e.g., K<L). In such embodiments, the receiver may be configured to use only part of the received symbols for estimating a phase offset between repetitions.

A carrier frequency offset may exist between the receiver (e.g., of vector y) and the transmitter (e.g., of vector b). Thus, the received symbols (e.g., the symbols in vector y), may be received with a phase offset or in other words may be phase rotated. Let $\Delta f$ represent the frequency offset that may exist between the transmitter and the receiver. Let $\phi_i$ represent a phase of a symbol $y_i$ ($0 \leq i \leq L-1$). Since successive replicas of the same symbol may be spaced L symbols apart, the phase difference, e.g., $\theta$, between successive elements in each vector $x_j$ may be calculated as $\theta = 2\pi \cdot \Delta f \cdot T \cdot L$, wherein T may represent a duration of a single symbol (e.g., thus T·L may represent a duration between successive repetitions of the same symbol). Consequently, the phases of symbols in a vector $x_j$ (e.g., $x_j = [y_i, y_{i+L}, \ldots, y_{i+(M-1)L}]$) may be represented as $\phi_i, \phi_i + \theta, \ldots, \phi_i + (M-1)\theta$, respectively.

The above reasoning may be applied to any of the symbol replica vectors $x_j$ (e.g., vectors $x_0, x_1, \ldots, x_{K-1}$). Even though each vector $x_j$ may be characterized by a different constant phase (e.g., the phase of element $x^j_0$ may be $\phi_j$), the phase offset between successive elements in each vector $x_j$ may be the same (e.g., $\theta$) in all the vectors $x_j$, and that phase offset (e.g., $\theta$) may be equal to the phase difference between successive repetitions. Consequently, the phase difference between successive repetitions may be estimated using symbol replica vectors $x_j$.

It may be noted that the above conclusion may allow overcoming a main deficiency in known phase-offset estimation methods, which yields poor estimations under low SNR conditions, as it may allow estimating a phase offset in one step while utilizing either many or all of the received repetitions (e.g., most or all the received energy, respectively).

The receiver may be configured to determine N phase-offset hypotheses (e.g., denoted as $\theta_0, \theta_1, \ldots, \theta_{N-1}$, e.g., in radians) corresponding to a phase difference (e.g., $\theta$) between successive repetitions (130). In some embodiments, said N phase hypotheses may be evenly spaced (e.g., between 0 and $2\pi$), while in some embodiments any set of N hypotheses may be used. In some embodiments, the number of said hypotheses, e.g., N, may be determined in accordance with any of a maximum expected frequency offset (e.g., a maximum carrier frequency offset that may exist between the receiver and the transmitter), a maximum expected phase offset over a duration of L symbols, a needed estimation resolution, and any computational limitations that may exist in any particular embodiment. In general, using more hypotheses may allow coping with a higher frequency offset and/or estimating at a finer resolution, whereas computational limitations may limit the number of hypotheses.

Furthermore, the receiver may be configured, e.g., after determining said phase-offset hypotheses, to calculate K combined symbol vectors $z_0$ to $z_{K-1}$ (140), wherein each element $z^j_n$ in a vector $z_j$ (e.g., $z_j = [z^j_0, z^j_1, \ldots, z^j_{N-1}]$, wherein $0 \leq j \leq K-1$) may be calculated by combining all the elements (e.g., $x^j_m$, wherein $0 \leq m \leq M-1$) in the corresponding vector $x_j$ (e.g., all received replicas of a symbol $y_i$, wherein $0 \leq i \leq L-1$) in accordance with a phase-offset hypothesis $\theta_n$ ($0 \leq n \leq N-1$). Thus, each combined symbol vector $z_j$ may comprise the results of combining all the received replicas of a symbol (e.g., as per a vector $x_j$) in accordance with all said phase-offset hypotheses (e.g., $\theta_0, \theta_1, \ldots, \theta_{N-1}$). In some embodiments, an element $z^j_n$ in a vector $z_j$ may be calculated according to the formula:

$$z^j_n = \sum_{m=0}^{M-1} x^j_m e^{-jm\theta_n}$$

In some embodiments, a vector $z_j$ may be calculated (computed) from a vector $x_j$ and in accordance with said determined phase hypotheses using a Fast Fourier Transform (FFT) or a Discrete Fourier Transform (DFT). In some of those embodiments, the size of the transform may be higher than the number of determined phase hypotheses (e.g., N), for example in order to achieve a more accurate estimation (e.g., finer or higher estimation resolution).

The receiver may be further configured to calculate K metric vectors $s_0$ to $s_{K-1}$ (e.g., $s_j = [s^j_0, s^j_1, \ldots, s^j_{N-1}]$, wherein $0 \leq j \leq K-1$) that may correspond to combined symbol vectors $z_0$ to $z_{K-1}$ (150). Each element $s^j_n$ in a vector $s_j$ may correspond, for example, to any of a power characteristic, an energy characteristic or an amplitude characteristic of a corresponding $z^j_n$ element in a corresponding $z_j$ vector (e.g., a corresponding symbol which may be combined from its corresponding replicas (e.g., as per a vector $x_j$) using a corresponding phase offset $\theta_n$). In some embodiments, each element $s^j_n$ in a metric vector $s_j$ may be computed from a corresponding element $z^j_n$ in a corresponding combined symbol vector $z_j$ using the absolute value operation, for example in accordance with the formula:

$$s^j_n = |z^j_n|$$

In some embodiments, each element $s^j_n$ in a metric vector $s_j$ may be computed from a corresponding element $z^j_n$ in a corresponding combined symbol vector $z_j$ using the Bessel function.

The receiver may be configured, e.g., upon calculating (computing) all K metric vectors $s_0$ to $s_{K-1}$, to calculate an average metric vector v (e.g., $v = [v_0, v_1, \ldots, v_{N-1}]$) (160), wherein each element $v_n$ ($0 \leq n \leq N-1$) in vector v may be calculated (computed) by averaging the K corresponding elements $s^0_n$ to $s^{K-1}_n$ from the corresponding K metric vectors $s_0$ to $s_{K-1}$, respectively.

The receiver may be further configured to determine the maximum element value in vector v (e.g., upon calculating (computing) the average metric vector v), for example, $V_{MAX}$ (e.g., $V_{MAX} = \text{MAX}(v_0, v_1, \ldots, v_{N-1})$) (170), to determine the index of the element in vector v having the maximum value $V_{MAX}$, e.g., index p ($v_p = V_{MAX}$, wherein $0 \leq p \leq N-1$), and to estimate a phase offset, e.g., $\theta'$, between each two consecutive repetitions of said M repetitions in accordance with the phase-offset hypothesis corresponding to said maximum value element $v_p$ (for example, $\theta' = \theta_p$, wherein $\theta'$ may be in radians) (180). In some embodiments, the receiver may be configured to use an interpolation technique over the elements of the average metric vector v, at least for the purpose of estimating said phase offset between repetitions, e.g., $\theta'$, more accurately or using higher resolution. Using an interpolated vector corresponding to vector v, the receiver may be configured to determine an element in the interpolated vector having a maximum value, to determine an interpolated phase-offset hypothesis corresponding to said element of the interpolated vector having the maximum value, and to determine a phase offset, e.g., θ', between each two consecutive repetitions of said M repetitions in accordance with said interpolated phase-offset hypothesis.

In some embodiments, the receiver may be configured to use the estimated phase offset, e.g., θ', for at least the purpose of coherently combining the elements of vector y, e.g., for combining the received M repetitions of said L symbols. First, the phase offsets between the M repetitions of each symbol (e.g., the repetitions may be spaces by L symbols) may be canceled to produce phase-corrected symbols, and then the phase-corrected symbols may be combined (summed) to produce coherently combined symbols. Denoting each combined symbol by $r_i$ (0≤i≤L−1), said combining may be represented as follows:

$$r_i = \sum_{m=0}^{M-1} y_{i+mL} e^{-j\theta'm}$$

Figure 2:
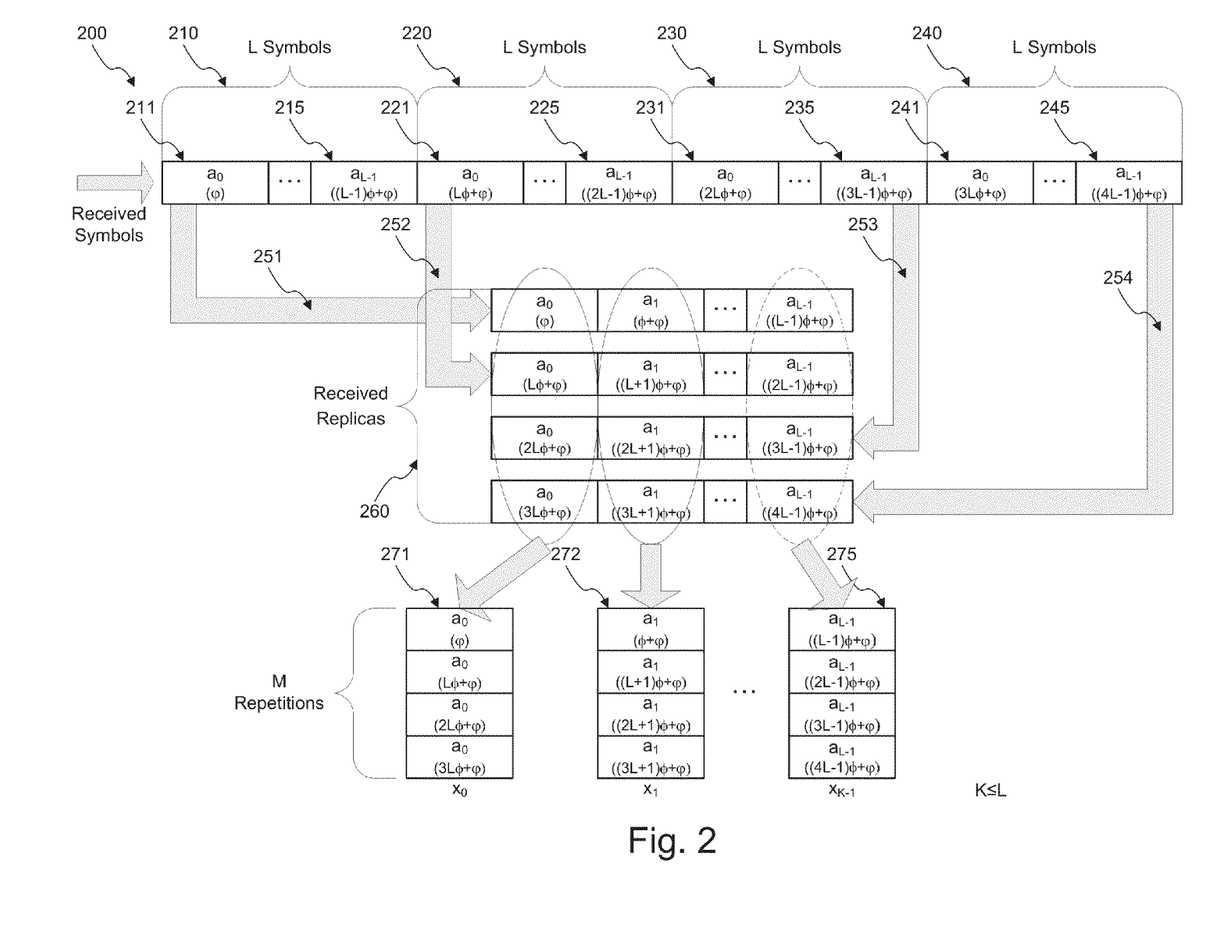
FIG. 2 shows an example of received repetitions and their processing in accordance with aspects of the disclosure.
Figure 3:
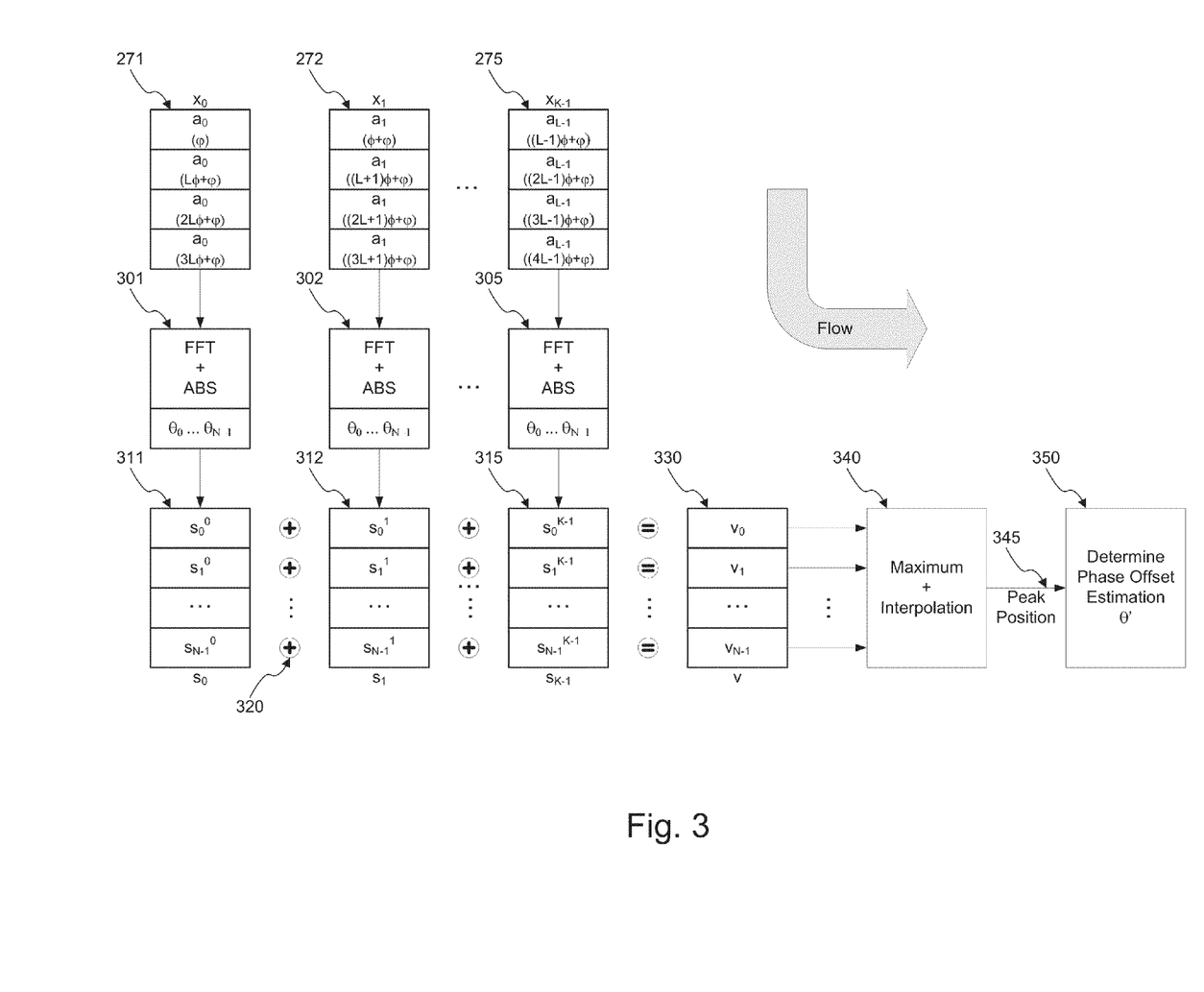
FIG. 3 shows an example of repetitions processing in accordance with aspects of the disclosure.

FIG. 2 and FIG. 3 together may present an example of the method described above in general terms. The embodiment described in that example is not necessarily a preferred embodiment or advantageous over any other possible embodiment, and should in no way be construed to exclude other embodiments or restrict the disclosure in any way.

FIG. 2 may present a received stream of symbols 200 comprising 4 symbol block repetitions 210, 220, 230 and 240 (e.g., M=4), each comprising L symbols. The modulated symbols may be denoted as $a_i$ (0≤i≤L−1) and each modulated symbol may be repeated four times at equal spacing of L symbols. For example, symbol $a_0$ may be repeated as symbols 211, 221, 231 and 241, and symbol $a_{L-1}$ may be repeated as symbols 215, 225, 235 and 245, in both examples corresponding to block repetitions 210, 220, 230 and 240, respectively. For each received symbol, FIG. 2 may denote in parenthesis the phase at which the symbol may be received. For example, symbol $a_0$ may be received at phase φ in the first repetition (211), at phase Lφ+φ in the second repetition (221), and at phases 2Lφ+φ and 3Lφ+φ in the third and fourth repetitions (231, 241), respectively. In the above notation, φ may represent the phase offset of the first received symbol (211) while a frequency offset that may exist between a transmitter of symbols 200 and a receiver of symbols 200 may cause a phase-offset increment of φ between adjacent symbols. Thus, using the same notation, a phase offset between two successive repetitions of the same symbol $a_i$, which may be separated by L symbols, may be denoted as Lφ.

Further in reference to FIG. 2, received symbols 200 may be ordered (251, 252, 253 and 254) into 4 row vectors (260), wherein each row vector may contain one repetition of each modulated symbol. As shown in FIG. 2, considering the columns that may be formed by the 4 row vectors (e.g., the first, second and last columns may be circled in the FIG. 2), each column may include all 4 repetitions of the same modulated symbol. Out of the L columns in vectors 260, K columns (K≤L) may be selected to form K vectors, for example, vectors 271, 272 and 275, also denoted as $x_0$, $x_1$ and $x_{K-1}$, respectively. Each vector $x_j$ (0≤j≤K−1) may include all 4 (M) repetitions of one modulated symbol. In some embodiments, all L columns may be selected (e.g., K=L), while in other embodiments only a subset of the L columns may be selected (e.g., K<L). Furthermore, in embodiments wherein a subset of the L columns may be selected (e.g., K<L), the K-th $x_j$ vector selected (e.g., 275) may be associated with any modulated symbol, for example not necessarily with the L-th (e.g., the last) modulated symbol as shown in FIG. 2.

FIG. 3 may present a continuation of the example described above, hence it may also depict said $x_j$ vectors 271, 272, 275. As shown in FIG. 3, a Fast Fourier Transform (FFT) followed by an absolute value operation (301, 302 and 305) may be applied to each of the $x_j$ vectors (271, 272 and 275, respectively), wherein the FFT may be of length N in accordance with N phase-offset hypotheses $θ_0$ to $θ_{N-1}$. In some embodiments, the FFT may be of length N≥M (for example, N=8, wherein in this example M=4) and each input vector $x_j$ may be extended to include the 4 received symbols and the necessary zero padding (e.g., 4 zero pads in case N=8). The FFT transforms followed by the absolute operations (301, 302 and 305) may yield K result vectors, each of length N, which may be denoted as $s_0$, $s_1$ and $s_{K-1}$ (311, 312 and 315, respectively). The result vectors $s_j$ may be averaged, e.g., by summing the K result vectors in accordance with their corresponding elements (320). The summation result may be a vector v (330), also of length N. A search for an element in vector v (330) having a maximum value may be performed (340). In some embodiments, parabolic interpolation may also be performed (340), at least at the vicinity (e.g., using the neighboring elements) of the maximum value element, at least for the purpose of determining a maximum peak position (e.g., within vector v) at a higher resolution. Once the peak has been determined (345), a phase offset between the repetitions 210, 220, 230 and 240 (e.g., θ') may be estimated (350) in accordance with the determined peak position (345), for example, as the phase that corresponds to the peak position.

In another aspect of the disclosure, another method for at least estimating a phase offset between repetitions may be presented. In some embodiments, this method may be used in the presence of ambiguity regarding a start time of at least a first repetition.

A signal may comprise modulated symbols. A vector a comprising L symbols (e.g., a=[$a_0$, $a_1$, ..., $a_{L-1}$], L>0), may represent a block of modulated symbols of length L. Vector a may be transmitted using a block repetition technique. A vector b (e.g., b=[a, a, ..., a]) may represent a transmitted vector of symbols, wherein vector b may comprise M repetitions (e.g., M≥2) of vector a, and wherein M may represent the number of repetitions and/or the spreading factor. Vector b may be transmitted via a medium (for example, a satellite link, any other wireless link, or any wired link) and received by a receiver as vector y (e.g., y=[$y_0$, $y_1$, ..., $y_{ML-1}$]).

Figure 4:
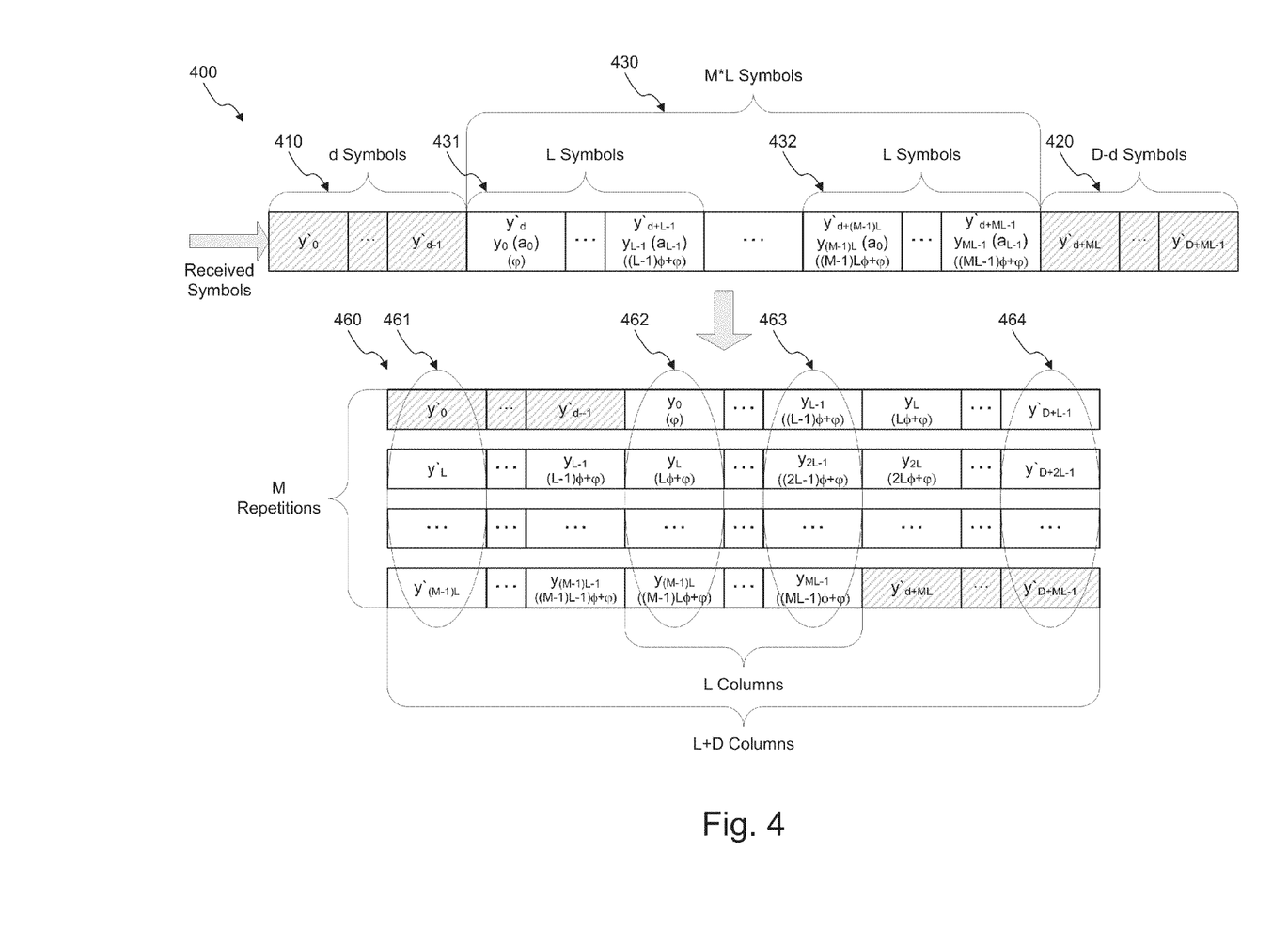
FIG. 4 shows an example of received repetitions and their processing in accordance with aspects of the disclosure.

In reference to FIG. 4, vector b may be transmitted in a transmission burst (e.g., M*L symbols long). A receiver that may receive the transmitted burst may receive a vector y' (400) (e.g., y'=[y'$_0$, ... y'$_{d-1}$, y'$_d$, ..., y'$_{d+ML-1}$, y'$_{d+ML}$, ..., y'$_{D+ML-1}$]), wherein vector y' (400) may comprise vector y (430) (e.g., y=[$y_0$, $y_1$, ..., $y_{ML-1}$]=[y'$_d$, y'$_{d+1}$, ..., y'$_{d+ML-1}$]) and any number of preceding and/or trailing other symbols (e.g., y'=[y'$_0$, ..., y'$_{d-1}$, $y_0$, $y_1$, ..., $y_{ML-1}$, y'$_{d+ML}$, ..., y'$_{D+ML-1}$], wherein y'$_0$, ..., y'$_{d-1}$, y'$_{d-ML}$, ..., y'$_{D+ML-1}$ may represent d preceding (410) symbols and D-d trailing symbols (420) and wherein d≤D). In some embodiments, said preceding and/or trailing other symbols (e.g., y'$_0$ ... y'$_{d-1}$, y'$_{d+ML}$, ..., y'$_{D+ML-1}$) may be any of noise symbols or symbols of other bursts, which may be transmitted on the same frequency as the burst containing the symbols of interest (e.g., vector y).

Further in reference to FIG. 4, the start position of vector y (430) within the received vector y' (400) may be ambiguous, for example, the number (d) of preceding other symbols (410) may change from one transmitted burst to another. Therefore, at least for the purpose of receiving all symbols of interest (e.g., vector y), a receiver that may be configured for receiving vector y' (400) may be further configured to utilize an observation window (460) longer than the length of vector y (e.g., longer than M*L symbols).

Each column in the observation window (460) may be derived from the received vector y' (400) by selecting M symbols from vector y' (400) at intervals of L symbols. For example, column 461 may correspond to starting the selection from symbol y'$_0$ (e.g., a preceding symbol), column 462 may correspond to starting the selection from symbol y$_0$ (e.g., the first symbol of the first repetition), column 463 may correspond to starting the selection from symbol y$_{L-1}$ (e.g., the last symbol of the first repetition), and column 464 may correspond to starting the selection at the last possible position, e.g., a position which may result in selecting the symbol y'$_{D+ML-1}$ (e.g., the last trailing symbol). Since vector y' (400) may include a total of M*L+D symbols (e.g., M*L symbols of interest and D preceding and/or trailing symbols), an observation window (460) comprising a column for every possible selection position may comprise L+D columns. Thus, given the position of vector y (430) within vector y' (400), D columns in the observation window (460) may include one or more of the preceding symbols (410) or one or more of the trailing symbols (420), and L columns may include only symbols of vector y (430).

From this point, the method for at least estimating a phase offset between the M repetitions may be similar to the one previously presented and may comprise the following steps:

Constructing K vectors $x_0$ to $x_{K-1}$, wherein each vector $x_j$ may comprise M symbols from vector y' (400) at intervals of L symbols, and wherein K may be smaller than, equal to, or larger than L. It may be noted that some vectors $x_j$ may include preceding or trailing symbols not included in vector y.

Determining N phase-offset hypotheses (e.g., denoted as $\theta_0, \theta_1, \ldots, \theta_{N-1}$, e.g., in radians) corresponding to a phase difference (e.g., $\theta$) between successive repetitions.

Calculating K combined symbol vectors $z_0$ to $z_{K-1}$, wherein each element $z^j_n$ in a vector $z_j$ (e.g., $z_j=[z^j_0, z^j_1, \ldots, z^j_{N-1}]$, wherein $0 \leq j \leq K-1$) may be calculated by combining all the elements (e.g., $x^j_m$, wherein $0 \leq m \leq M-1$) in the corresponding vector $x_j$ in accordance with a phase-offset hypothesis $\theta_n$ ($0 \leq n \leq N-1$). In some embodiments, an element $z^j_n$ in a vector $z_j$ may be calculated according to the following formula, for example, using a Fast Fourier Transform (FFT) or a Discrete Fourier Transform (DFT):

$$z^j_n = \sum_{m=0}^{M-1} x^j_m e^{-jm\theta_n}$$

Calculating K metric vectors $s_0$ to $s_{K-1}$ (e.g., $s_j=[s^j_0, s^j_1, \ldots, s^j_{N-1}]$, wherein $0 \leq j \leq K-1$) that may correspond to combined symbol vectors $z_0$ to $z_{K-1}$. Each element $s^j_n$ in a vector $s_j$ may correspond, for example, to any of a power characteristic, an energy characteristic or an amplitude characteristic of a corresponding $z^j_n$ element in a corresponding $z_j$ vector. In some embodiments, each element $s^j_n$ in a metric vector $s_j$ may be computed from a corresponding element $z^j_n$ in a corresponding combined symbol vector $z_j$ using the absolute value operation, for example, in accordance with the formula:

$$s^j_n = |z^j_n|$$

In some embodiments, each element $s^j_n$ in a metric vector $s_j$ may be computed from a corresponding element $z^j_n$ in a corresponding combined symbol vector $z_j$ using the Bessel function.

It may be noted that a vector $z_j$ that may be combined from a vector $x_j$ that may include preceding or trailing symbols (e.g., noise symbols which may not be included in vector y), may be associated with lower power, energy or amplitude characteristics. Thus, the metric values in the $s_j$ vector corresponding to such $z_j$ vector may be lower than corresponding values in $s_j$ vectors corresponding to $x_j$ vectors including only symbols from vector y (e.g., no preceding or trailing noise symbols), even for the correct phase-shift hypothesis.

Determining an averaging length C (e.g., $C \leq K$) and calculating average metric vectors $v_0$ to $v_{K-C}$ (e.g., $v_j=[v^j_0, v^j_1, \ldots, v^j_{N-1}]$, wherein $0 \leq j \leq K-C$), wherein each element $v^j_n$ ($0 \leq n \leq N-1$) in a vector $v_j$ may be calculated (computed) by averaging the C corresponding elements $s^j_n$ to $s^{j+C-1}_n$ from the corresponding C metric vectors $s_j$ to $s_{j+C-1}$, respectively. In some embodiments, this averaging may be computed using an Infinite Impulse Response (IIR) filter. In some embodiments, for example at least for the purpose of reducing computation complexity, only some of the vectors $v_0$ to $v_{K-C}$ may be calculated.

Determining the maximum element value in each vector $v_j$ (e.g., $V^j_{MAX}=\text{MAX}(v^j_0, \ldots, v^j_{N-1})$, wherein $0 \leq j \leq K-C$) and selecting the vector $v_j$ having the maximum element value, e.g., $V_{MAX}(V_{MAX}=\text{MAX}(V^0_{MAX}, \ldots, V^{K-C}_{MAX}))$.

Determining the index of the element having the maximum value (e.g., $V_{MAX}$) in said selected $v_j$ vector, e.g., index p ($v_p=V_{MAX}$, wherein $0 \leq p \leq N-1$), and estimating a phase offset, e.g., $\theta'$, between each two consecutive repetitions of said M repetitions in accordance with the phase-offset hypothesis corresponding to said maximum value element $v_p$ (for example, $\theta'=\theta_p$, wherein $\theta'$ may be in radians). In some embodiments, an interpolation technique may be used over the elements of said selected average metric vector $v_j$, at least for the purpose of estimating said phase offset between repetitions, e.g., $\theta'$, more accurately or at higher resolution.

In some embodiments, determining the average length C, calculating the average metric vectors $v_0$ to $v_{K-C}$, and/or determining the maximum element value in each vector $v_j$ (e.g., as described above) may be performed in parallel. For example, the maximum element value in a $v_j$ vector (e.g., $V^j_{MAX}$) may be determined in parallel to calculating that $v_j$ vector. Once the vector $v_j$ may be fully calculated, its maximum element value may be determined. In addition, if the determined maximum element value corresponding to the current $v_j$ vector exceeds a previously found maximum element value (e.g., associated with a previously calculated $v_j$ vector), the current vector may be selected, otherwise the previously selected vector may remain selected.

In some embodiments, the method described above may also comprise a step of using the estimated phase offset, e.g., $\theta'$, for at least the purpose of coherently combining the received repetitions. First, the phase offsets between the M repetitions may be canceled to produce phase-corrected symbols, and then the phase-corrected symbols may be combined (summed) to produce coherently combined symbols.

In another aspect of the disclosure, a satellite communication system may be presented. The satellite communication system may comprise at least one transmitter and at least one receiver, wherein the at least one transmitter may be configured to transmit via a satellite towards the at least one receiver and the at least one receiver may be configured to receive a transmission from the at least one transmitter via the satellite. Furthermore, in said satellite communication system, the at least one transmitter may be configured to transmit towards the at least one receiver modulated symbols using a block repetition technique and the at least one receiver may be configured to receive block repetitions of modulated symbols and to coherently combine the repetitions for at least the purpose of receiving the information transmitted by the at least one receiver.

In some embodiments, the at least one receiver may be configured to use any of the above described methods for at least the purpose of estimating a phase offset between received repetitions. In some embodiments, the at least one receiver may be further configured to use said estimated phase offset for at least the purpose of coherently combining the received repetitions, wherein said coherently combining may include cancelation of the phase offsets between the received repetitions of each symbol to produce phase-corrected symbols, and then combining (summing) the phase-corrected symbols to produce coherently combined symbols.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method, comprising:
    receiving a stream of symbols, the stream of symbols comprising M block repetitions, each block repetition of the M block repetitions comprising L symbols, wherein M≥2 and L>0;
    constructing K symbol replica vectors, wherein K≤L and each symbol replica vector of the K symbol replica vectors comprises M received symbols from the stream of symbols, and wherein successive symbols in a symbol replica vector of the K symbol replica vectors are located within said stream of symbols at an interval of L symbols;
    determining N phase-offset hypotheses, wherein N>0;
    calculating K combined symbol vectors of length N, wherein each element in each combined symbol vector of the K combined symbol vectors is calculated by combining, in accordance with a corresponding phase-offset hypothesis of the N phase-offset hypotheses, one or more symbols included in a corresponding symbol replica vector of the K symbol replica vectors;
    calculating K metric vectors of length N corresponding to the K combined symbol vectors;
    calculating an average metric vector of length N, wherein each element in the average metric vector is calculated by at least one of averaging or summing K corresponding elements from the K metric vectors;
    identifying, from amongst a plurality of elements in the average metric vector, an element having a maximum value; and
    determining, in accordance with a phase-offset hypothesis that corresponds to the element having the maximum value, an estimated phase offset.

2. The method of claim 1, wherein said N phase-offset hypotheses are evenly spaced.

3. The method of claim 1, wherein determining said N phase-offset hypotheses comprises determining said N phase-offset hypotheses in accordance with at least one of an expected maximum carrier frequency offset between a transmitter and a receiver, a maximum expected phase offset corresponding to a determined duration of L symbols, a specified phase-offset estimation resolution, or one or more computation limitations.

4. The method of claim 1, wherein calculating said K combined symbol vectors of length N comprises utilizing at least one of a Fast Fourier Transform (FFT) or a Discrete Fourier Transform (DFT).

5. The method of claim 1, wherein each element in each metric vector of said K metric vectors corresponds to at least one of one or more power characteristics, one or more energy characteristics, or one or more amplitude characteristics of a corresponding element in a corresponding combined symbol vector of the K combined symbol vectors.

6. The method of claim 1, wherein calculating said K metric vectors of length N comprises performing an absolute value operation over one or more corresponding elements of the K combined symbol vectors.

7. The method of claim 1, wherein calculating said K metric vectors of length N comprises utilizing a Bessel function.

8. The method of claim 1, comprising interpolating the average metric vector to create an interpolated vector, wherein identifying, from amongst the plurality of elements in the average metric vector, the element having the maximum value comprises identifying, from amongst a plurality of elements in the interpolated vector, an element of the plurality of elements in the interpolated vector that has a maximum value, and wherein determining said estimated phase offset comprises determining, in accordance with an interpolated phase-offset hypothesis corresponding to said element of the plurality of elements in the interpolated vector that has the maximum value, the estimated phase offset.

9. The method of claim 1, wherein determining said estimated phase offset comprises determining the estimated phase offset to be a phase offset between each two consecutive repetitions of said M block repetitions.

10. The method of claim 1, comprising:
    canceling, in accordance with said estimated phase offset, one or more phase offsets between the M block repetitions to produce phase-corrected symbols; and summing the phase-corrected symbols to coherently combined symbols.

11. A satellite-communication system comprising:
an antenna; and
a receiver configured to:
receive, via the antenna, a stream of symbols, the stream of symbols comprising M block repetitions, each block repetition of the M block repetitions comprising L symbols, wherein M≥2 and L>0;
construct K symbol replica vectors, wherein K≤L and each symbol replica vector of the K symbol replica vectors comprises M received symbols from the stream of symbols, wherein successive symbols in a symbol replica vector of the K symbol replica vectors are located within said stream of symbols at an interval of L symbols;
determine N phase-offset hypotheses, wherein N>0;
calculate K combined symbol vectors of length N, wherein each element in each combined symbol vector of the K combined symbol vectors is calculated by combining, in accordance with a corresponding phase-offset hypothesis of the N phase-offset hypotheses, one or more symbols included in a corresponding symbol replica vector of the K symbol replica vectors;
calculate K metric vectors of length N corresponding to the K combined symbol vectors;
calculate an average metric vector of length N, wherein each element in the average metric vector is calculated by at least one of averaging or summing K corresponding elements from the K metric vectors;
identify, from amongst a plurality of elements in the average metric vector, an element having a maximum value; and
determine, in accordance with a phase-offset hypothesis that corresponds to the element having the maximum value, an estimated phase offset.

12. The satellite-communication system of claim 11, wherein the receiver is configured to determine said N phase-offset hypotheses in accordance with at least one of an expected maximum carrier frequency offset between a transmitter of said stream of symbols and the receiver, a maximum expected phase offset corresponding to a determined duration of L symbols, a specified phase-offset estimation resolution, or one or more computation limitations of the receiver.

13. The satellite-communication system of claim 11, wherein the receiver is configured to utilize at least one of a Fast Fourier Transform (FFT) or a Discrete Fourier Transform (DFT) to calculate said K combined symbol vectors of length N.

14. The satellite-communication system of claim 11, wherein each element in each metric vector of said K metric vectors corresponds to at least one of one or more power characteristics, one or more energy characteristics, or one or more amplitude characteristics of a corresponding element in a corresponding combined symbol vector of the K combined symbol vectors.

15. The satellite-communication system of claim 11, wherein the receiver is configured to:
interpolate the average metric vector to create an interpolated vector;
identify, from amongst a plurality of elements in the interpolated vector, an element having a maximum value; and
determine, in accordance with an interpolated phase-offset hypothesis corresponding to said element of the plurality of elements in the interpolated vector that has the maximum value, the estimated phase offset.

16. The satellite-communication system of claim 11, wherein the receiver is configured to:
determine a phase offset between each two consecutive repetitions of said M block repetitions to be the same as said estimated phase offset;
cancel, in accordance with said estimated phase offset, one or more phase offsets between the M block repetitions to produce phase-corrected symbols; and
sum the phase-corrected symbols to produce coherently combined symbols.

17. A method, comprising:
receiving a stream of symbols, the stream of symbols comprising M block repetitions, each block repetition of the M block repetitions comprising L symbols, wherein a D number of symbols at least one of precede the block repetitions or trail the block repetitions, and wherein M≥2, L>0, and D>0;
constructing K symbol replica vectors, wherein each symbol replica vector of the K symbol replica vectors comprises M received symbols from the stream of symbols, wherein successive symbols in a symbol replica vector of the K symbol replica vectors are located within said stream of symbols at an interval of L symbols, and wherein K≤L+D;
determining N phase-offset hypotheses, wherein N>0;
calculating K combined symbol vectors of length N, wherein each element in each combined symbol vector of the K combined symbol vectors is calculated by combining, in accordance with a corresponding phase-offset hypothesis of the N phase-offset hypotheses, one or more symbols included in a corresponding symbol replica vector of the K symbol replica vectors;
calculating K metric vectors of length N corresponding to the K combined symbol vectors;
determining an averaging length C, wherein C is less than or equal to K;
calculating a plurality of average metric vectors of length N, wherein each element in an average metric vector of the plurality of average metric vectors is calculated by at least one of averaging or summing C corresponding elements from C corresponding metric vectors of the K metric vectors;
identifying, from amongst the plurality of average metric vectors, an average metric vector comprising an element with a maximum value relative to values of each of the elements of each average metric vector of the plurality of average metric vectors; and
determining, in accordance with a phase offset-hypothesis that corresponds to the element with the maximum value, an estimated phase offset.

18. The method of claim 17, wherein said N phase-offset hypotheses are evenly spaced.

19. The method of claim 17, wherein determining said N phase-offset hypotheses comprises determining said N phase-offset hypotheses in accordance with at least one of an expected maximum carrier frequency offset between a transmitter and a receiver, a maximum expected phase offset corresponding to a determined duration of L symbols, a specified phase-offset estimation resolution, or one or more computation limitations.

20. The method of claim 17, wherein calculating said K combined symbol vectors of length N comprises utilizing at least one of a Fast Fourier Transform (FFT) or a Discrete Fourier Transform (DFT).

21. The method of claim 17, wherein each element in each metric vector of said K metric vectors corresponds to at least one of one or more power characteristics, one or more energy characteristics, or one or more amplitude characteristics of a corresponding element in a corresponding combined symbol vector of the K combined symbol vectors.

22. The method of claim 17, wherein calculating said K metric vectors of length N comprises performing an absolute value operation over one or more corresponding elements of the K combined symbol vectors.

23. The method of claim 17, wherein calculating said K metric vectors of length N comprises utilizing a Bessel function.

24. The method of claim 17, wherein calculating the plurality of average metric vectors comprises utilizing an Infinite Impulse Response (IIR) filter.

25. The method of claim 17, wherein each average metric vector of the plurality of average metric vectors is calculated using a different set of corresponding metric vectors of the K metric vectors, and wherein at least one metric vector of the K metric vectors is used for calculating more than one average metric vector of the plurality of average metric vectors.

26. The method of claim 17, wherein determining the estimated phase offset comprises:

interpolating the average metric vector comprising the element with the maximum value to create an interpolated vector;

identifying, from amongst a plurality of elements in the interpolated vector, an element of the plurality of elements in the interpolated vector that has a maximum value; and determining, in accordance with an interpolated phase-offset hypothesis corresponding to said element of the plurality of elements in the interpolated vector that has the maximum value, the estimated phase offset.

27. The method of claim 17, wherein determining said estimated phase offset comprises determining the estimated phase offset to be a phase offset between each two consecutive repetitions of said M block repetitions.

28. The method of claim 17, comprising:

canceling, in accordance with said estimated phase offset, one or more phase offsets between the M block repetitions to produce phase-corrected symbols; and summing the phase-corrected symbols to produce coherently combined symbols.

* * * * *